US012737122B2

(12) United States Patent
Iannuzzelli et al.

(10) Patent No.: US 12,737,122 B2
(45) Date of Patent: Sep. 15, 2026

(54) METHOD AND SYSTEM FOR SYNCHRONIZING AUDIO TRANSMISSION IN A SINGLE FREQUENCY NETWORK

(71) Applicant: iBiquity Digital Corporation, Columbia, MD (US)

(72) Inventors: Russell Iannuzzelli, Columbia, MD (US); William Snelling, Columbia, MD (US); John Wells, IV, Columbia, MD (US); Jeffrey Detweiler, Columbia, MD (US)

(73) Assignee: iBiquity Digital Corporation, Columbia, MD (US)

( * ) Notice: Subject to any disclaimer, the term of this patent is extended or adjusted under 35 U.S.C. 154(b) by 165 days.

(21) Appl. No.: 18/724,671

(22) PCT Filed: Dec. 29, 2022

(86) PCT No.: PCT/US2022/082556
§ 371 (c)(1),
(2) Date: Jun. 27, 2024

(87) PCT Pub. No.: WO2023/130025
PCT Pub. Date: Jul. 6, 2023

(65) Prior Publication Data

US 2025/0167906 A1 May 22, 2025

Related U.S. Application Data

(60) Provisional application No. 63/295,359, filed on Dec. 30, 2021.

(51) Int. Cl.
*H04H 20/30* (2008.01)
*G06F 3/06* (2006.01)
(Continued)

(52) U.S. Cl.
CPC .......... *G06F 3/0617* (2013.01); *G06F 3/0653* (2013.01); *G06F 3/0679* (2013.01); *H04H 20/103* (2013.01); *H04H 20/67* (2013.01)

(58) Field of Classification Search
CPC .... G06F 3/0617; G06F 3/0653; G06F 3/0679; H04H 20/103; H04H 20/67;
(Continued)

(56) References Cited

U.S. PATENT DOCUMENTS 8,989,405 B2 * 3/2015 Nakamura ............ G10L 19/008 381/104
9,183,190 B2 * 11/2015 Stoeckmann ......... G06F 40/157
(Continued)

FOREIGN PATENT DOCUMENTS

WO 2010/043498 A1 4/2010

OTHER PUBLICATIONS

International Search Report for Application No. PCT/US2022/082556 mailed Apr. 18, 2023. 3 pgs.

*Primary Examiner* — Andrew Wendell
(74) *Attorney, Agent, or Firm* — Lerner David LLP

(57) ABSTRACT

Methods and systems for synchronizing audio transmission in a single frequency network. Aspects of a method include preparing in a first exporter a first digital audio signal for transmission to a first exciter engine; buffering the first digital audio signal and transmitting the buffered first digital audio signal to the first exciter engine; preparing in a second exporter a second digital audio signal for transmission to a second exciter engine; buffering the second digital audio signal; transmitting the first digital audio signal from the first control unit to the second control unit; receiving control commands regarding a buffered first or second digital audio signal, wherein the second control unit transmits the buffered first or second digital audio signal dependent on the
(Continued)

received control commands; and synchronized transmission of the buffered first digital audio signal and the buffered first or second digital audio signal based on a received trigger signal.

20 Claims, 5 Drawing Sheets

(51) Int. Cl.
*H04H 20/10* (2008.01)
*H04H 20/67* (2008.01)

(58) Field of Classification Search
CPC ......... H04H 2201/18; H04H 2201/183; H04H 2201/186; H04H 20/30; H04H 20/36; H04M 3/568; H04B 1/207; H04B 1/04
See application file for complete search history.

(56) References Cited

U.S. PATENT DOCUMENTS 9,467,656 B1 * 10/2016 Leizerovich .......... H04W 4/026
11,705,719 B1 * 7/2023 Munshi .................... H02H 7/06 361/20
2007/0036388 A1 * 2/2007 Lee .......................... H04R 1/26 381/431
2007/0299552 A1 * 12/2007 Chang ................ H03H 17/0621 700/94
2010/0166042 A1 7/2010 Iannuzzelli et al.
2013/0163781 A1 * 6/2013 Thyssen .................. G10L 25/51 381/94.1
2014/0270008 A1 * 9/2014 Goodson .............. H04B 7/0817 375/340
2017/0194017 A1 * 7/2017 Yamamoto ............... H03G 3/34
2021/0297777 A1 * 9/2021 Soulier ................... H04W 4/80
2022/0417630 A1 * 12/2022 Beltran ................... H03F 3/183

* cited by examiner t2

N

N + 1
ALFN

N + 2

METHOD AND SYSTEM FOR SYNCHRONIZING AUDIO TRANSMISSION IN A SINGLE FREQUENCY NETWORK

CROSS-REFERENCE TO RELATED APPLICATIONS

This application is a national phase entry under 35 U.S.C. § 371 of International Application No. PCT/US2022/082556, filed Dec. 29, 2022, which claims the benefit of U.S. Provisional Application No. 63/295,359, filed on Dec. 30, 2021, all of which are hereby incorporated by reference in their entirety

BACKGROUND

Over-the-air radio broadcast signals are used to deliver a variety of programming content (e.g., audio, etc.) to radio receiver systems. Such over-the-air radio broadcast signals can include conventional AM (amplitude modulation) and FM (frequency modulation) analog broadcast signals, digital radio broadcast signals, or other broadcast signals. Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ by iBiquity Digital Corporation is based on IBOC digital radio broadcasting.

Technologies are known in digital radio broadcasting that deploy multiple transmitters which are fully synchronized and use a single frequency network (SFN) to boost reception performance in certain areas. Further, technologies are known that allow for varied content on the multiple transmitters that use a single frequency network. For example, local radio stations may broadcast news, ads, emergency alerts etc. to limited geographical zones. To implement such technologies in a digital radio broadcasting system such as HD Radio™, there is a need for a method and broadcast infrastructure that allow synchronized transmission of the same or different content over multiple transmitters.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An aspect of the present invention provides for a method for synchronizing audio transmission in a single frequency network. The method comprises: preparing in a first exporter a first digital audio signal for transmission to a first exciter engine of the single frequency network; buffering the first digital audio signal in a first control unit associated with the first exporter and transmitting the buffered first digital audio signal to the first exciter engine for broadcast by the first exciter engine; preparing in a second exporter a second digital audio signal for transmission to a second exciter engine of the single frequency network; buffering the second digital audio signal in a second control unit associated with the second exporter; transmitting the first digital audio signal from the first control unit to the second control unit; buffering in addition to the second digital audio signal also the first digital audio signal at the second control unit; receiving control commands at the second control unit regarding the second control unit transmitting the buffered first digital audio signal or the buffered second digital audio signal to the second exciter engine, wherein the second control unit transmits the buffered first digital audio signal or the buffered second digital audio signal to the second exciter engine for broadcast by the second exciter engine dependent on the received control commands; and synchronized transmission of the buffered first digital audio signal by the first control unit to the first exciter engine and of the buffered first or second digital audio signal by the second control unit to the second exciter engine based on a trigger signal received by the first and second control units.

Aspects of the present invention are thus based on the idea to synchronize transmission of audio from different exporters to respective exciter engines by means of a trigger signal. At the same time, varied content may be provided by the different exporters in different regions by means of a method and architecture in which a first control unit associated with a first exporter provides a first digital audio signal to a second control unit associated with a second exporter, wherein the second control unit receives both the first digital audio signal and a second audio signal provided by the exporter. Dependent on control commands received at the second control unit, the second control unit can export either the first digital audio signal or the second digital audio signal to a second exciter engine, such that either the first digital audio signal or the second digital audio signal is broadcast by the second exciter engine. Accordingly, same or different content may be provided by the second exciter engine compared to the content provided by a first exciter engine that receives the first audio signal from the first control unit.

Aspects of the present invention thus allow to synchronously start multiple exporters and provides for a scheme to allow for broadcast content to be the same or different, wherein content may be switched in different geographical areas associated with different exciter engines.

It is pointed out that the first control unit may be considered part of an extended first exciter, and that the second control unit may be considered part of an extended second exciter. In particular, the software programs implemented to provide the first and second control units may run on the same processing hardware as the first and second exciter, respectively.

The trigger signal that triggers synchronized transmission of the buffered first digital audio signal by the first control to the first exciter engine and of the buffered first or second digital audio signal by the second control unit to the second exciter engine may be an Absolute Logical Frame Number (ALFN) interrupt. An ALFN identifies an absolute layer 1 frame number. It represents a well-known timekeeper and gates the information from the exporters to the exciter engines. The ALFN interrupt may be provided by a separate hardware element. It is pointed out that the present invention is not limited to an ALFN trigger signal and other trigger signals may be implemented.

In an embodiment, the first control unit is a controlling control unit and the second control unit is an agent control unit acting upon control commands by the first control unit. The first control unit, accordingly, may be considered a master control unit and the second control unit may be considered a slave control unit acting on commands by the master control unit. Similarly, the first exporter may be considered a controller or master exporter and the second exporter may be considered an agent or slave exporter.

In an embodiment, the control commands sent from the first control unit to the second control unit include at least one of: control commands regarding using the first buffered audio signal or the second buffered audio signal for export to the second exciter engine; control commands regarding control of a state of the second control unit, the state of the second control unit including at least one of an initialization state and an active or run state; and control commands regarding commencing exporting the first buffered audio signal or the second buffered audio signal to the second exciter engine on the next trigger signal.

It may be provided that both the first digital audio signal and the second digital audio signal include at least a main program service digital audio signal.

It may be further provided that the first digital audio signal includes non-local content that is broadcast to the full coverage area of the single frequency network, and that the second digital audio signal includes local content that is broadcast to a reduced geographic zone inside the full coverage area of the single frequency network only. The reduced geographic zone may be a geo-targeted zone.

In an embodiment, the steps of preparing a digital audio signal for transmission to an exciter engine in the first and second exciter engines include: receiving main program service (MPS) digital audio signals and MPS data; accepting advanced application services (APS) audio signals and APS data coming from an importer; and combining the MPS and APS audio signals and data into a digital audio signal for transport to the exciter engine. Such combined audio signal is provided from the exciter to the respective control unit and further to the respective exciter engine.

In a further embodiment, the first control unit communicates with further control units associated with further exporters in the same manner as with the second control unit. In particular, it provides the first digital audio signal and, signals to the other control units as well. The further control units and their associated exporters may provide for further local content that may or may not be broadcast.

The control commands received at the second control unit regarding the second control unit transmitting the buffered first digital audio signal or the buffered second digital audio signal to the second exciter engine may generally be generated by any unit that decides upon whether local content or non-local content shall be broadcast by the second exciter engine. In an embodiment, the respective control commands are sent from the first control unit to the second control unit based on commands received at the first control unit or at the first exporter. Accordingly, the first (controller) exporter may command the second (agent) exporter to either use the master content or to use its own local content.

Generally, the switch over can be seamless.

In a further aspect, the present invention regards a system for synchronizing audio transmission for broadcast in a single frequency network. The system comprises: a first exporter configured to prepare a first digital audio signal for transmission to a first exciter engine of the single frequency network; a first control unit configured to buffer the first digital audio signal and transmit the buffered first digital audio signal to the first exciter engine for broadcast by the first exciter engine; a second exporter configured to prepare a second digital audio signal for transmission to a second exciter engine of the single frequency network; a second control unit configured to buffer the second digital audio signal. The first control unit is further configured to transmit the first digital audio signal from the first control unit to the second control unit. The second control unit is further configured to also buffer the first digital audio signal. The second control unit is further configured to receive control commands regarding transmitting the buffered first digital audio signal or the buffered second digital audio signal to the second exciter engine, and to transmit the buffered first digital audio signal or the buffered second digital audio signal to the second exciter engine for broadcast by the second exciter engine dependent on the received control commands. Both the first control unit and the second control unit are configured to synchronously transmit the buffered digital audio signal to the respective exciter engine based on a trigger signal received by the first and second control units.

As discussed before, the first digital audio signal may include non-local content that is broadcast to the full coverage area of the single frequency network, and the second digital audio signal may include local content that is broadcast to a reduced geographic zone inside the full coverage area of the single frequency network only.

In an embodiment, the second control unit comprises: a first data queue for buffering the first audio signal; a second data queue for buffering the second audio signal; and a switch, the switch comprising a first input coupled to the first data queue, a second input coupled to the second data queue, and an output coupled to a link for outputting data to the second exciter engine. The switch is configured to switch first input or the second input to the output dependent on control commands received by the first control unit.

A still further embodiment, the first control unit comprises: a data queue for buffering the first audio signal; and a state transition module, wherein the state transition module is configured to receive the buffered first audio signal from the data queue, output the buffered first audio signal to the first exciter engine, transmit control commands to the second control unit, and receive external synchronizing commands such as the trigger signal.

Embodiments of the present invention may be implemented for virtually any digital radio broadcasting system, such as HD Radio™, DAB+, DRM, CDR, and many others.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

Figure 1:
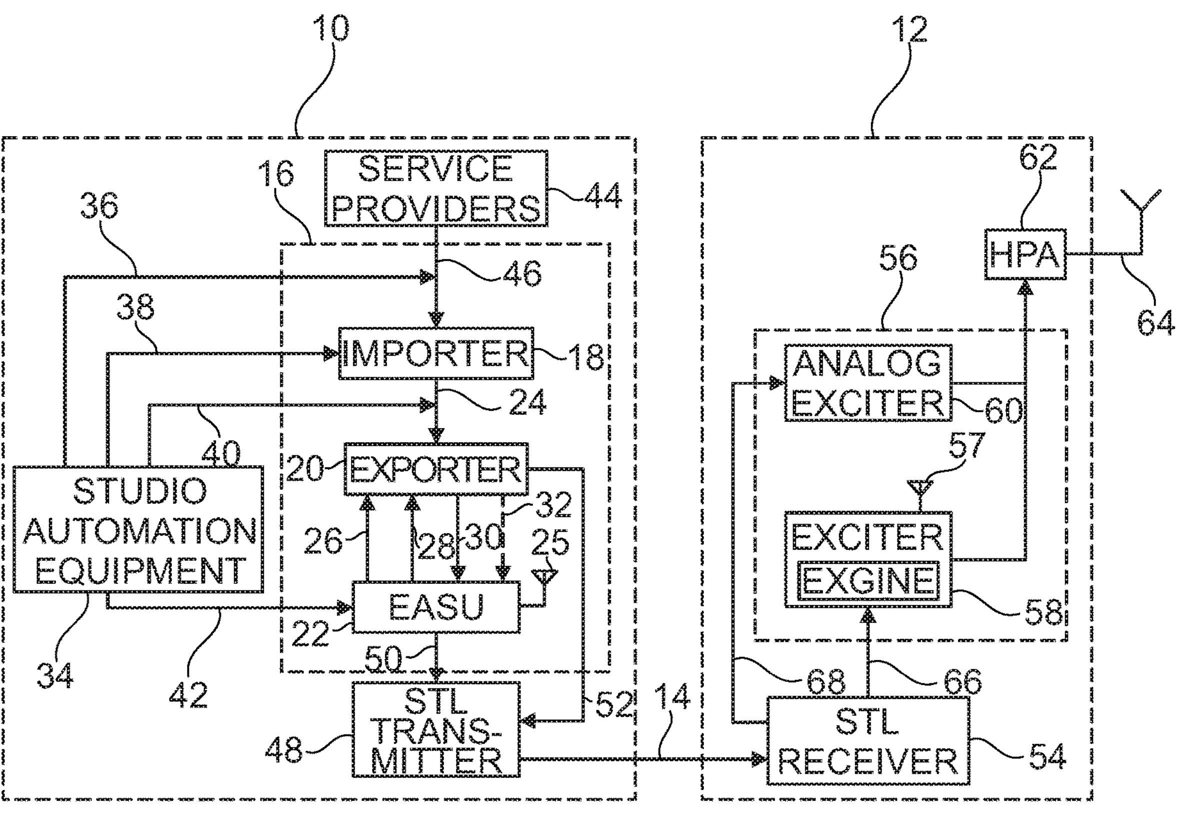
FIG. 1 is a block diagram of a transmitter for use in a in-band on-channel (IBOC) digital radio broadcasting system.

The following description describes various embodiments of methods and systems that provide improved broadcasting of IBOC radio signals. FIG. 1 is a functional block diagram of a portion of the components of a studio site 10, an FM transmitter site 12, and a studio transmitter link (STL) 14 that can be used to broadcast an FM IBOC DAB signal. The studio site includes, among other things, studio automation equipment 34, an Ensemble Operations Center (EOC) 16 that includes an importer 18, an exporter 20, an exciter auxiliary service unit (EASU) 22, and an STL transmitter 48. The transmitter site includes an STL receiver 54, a digital exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer. MPS audio serves as the main audio programming source. In hybrid modes, it preserves the existing analog radio programming formats in both the analog and digital transmissions. MPS data, also known as program service data (PSD), includes information such as music title, artist, album name, etc. Supplemental program service can include supplementary audio content as well as program associated data.

The importer contains hardware and software for supplying advanced application services (AAS). A "service" is content that is delivered to users via an IBOC DAB broadcast, and AAS can include any type of data that is not classified as MPS, SPS, or Station Information Service (SIS). SIS provides station information, such as call sign, absolute time, position correlated to GPS, etc. Examples of AAS data include real-time traffic and weather information, navigation map updates or other images, electronic program guides, multimedia programming, other audio services, and other content. The content for AAS can be supplied by service providers 44, which provide service data 46 to the importer via an application program interface (API). The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link.

The exporter 20 contains the hardware and software necessary to supply the main program service and SIS for broadcasting. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC DAB broadcasts. The delay compensates for the system delay of the digital MPS audio, allowing receivers to blend between the digital and analog program without a shift in time. In an AM transmission system, the delayed MPS audio signal 30 is converted by the exporter to a mono channel signal and sent directly to the STL as part of the exciter link data 52.

The EASU 22 accepts MPS audio 42 from the studio automation equipment, rate converts it to the proper system clock, and outputs two copies of the signal, one digital 26 and one analog 28. The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol or the standard TCP/IP.

The transmitter site includes an STL receiver 54, an exciter 56 and an analog exciter 60. The STL receiver 54 receives exciter link data, including audio and data signals as well as command and control messages, over the STL link 14. The exciter link data is passed to the exciter 56, which produces the IBOC DAB waveform. The exciter includes a host processor, digital up-converter, RF up-converter, and exgine subsystem 58. The exgine accepts exciter link data and modulates the digital portion of the IBOC DAB waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 can include a GPS unit and antenna 57. The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, the exciter 56 produces phase and magnitude information and the analog signal is output directly to the high power amplifier.

IBOC DAB signals can be transmitted in both AM and FM radio bands, using a variety of waveforms. The waveforms include an FM hybrid IBOC DAB waveform, an FM all-digital IBOC DAB waveform, an AM hybrid IBOC DAB waveform, and an AM all-digital IBOC DAB waveform.

Based on the infrastructure generally described with respect to FIG. 1, the present invention addresses the problem, when deploying multiple transmitters in a single frequency network (SFN), how to optionally provide varied content on the multiple transmitters and at the same time fully synchronize the multiple transmitters.

Figure 2:
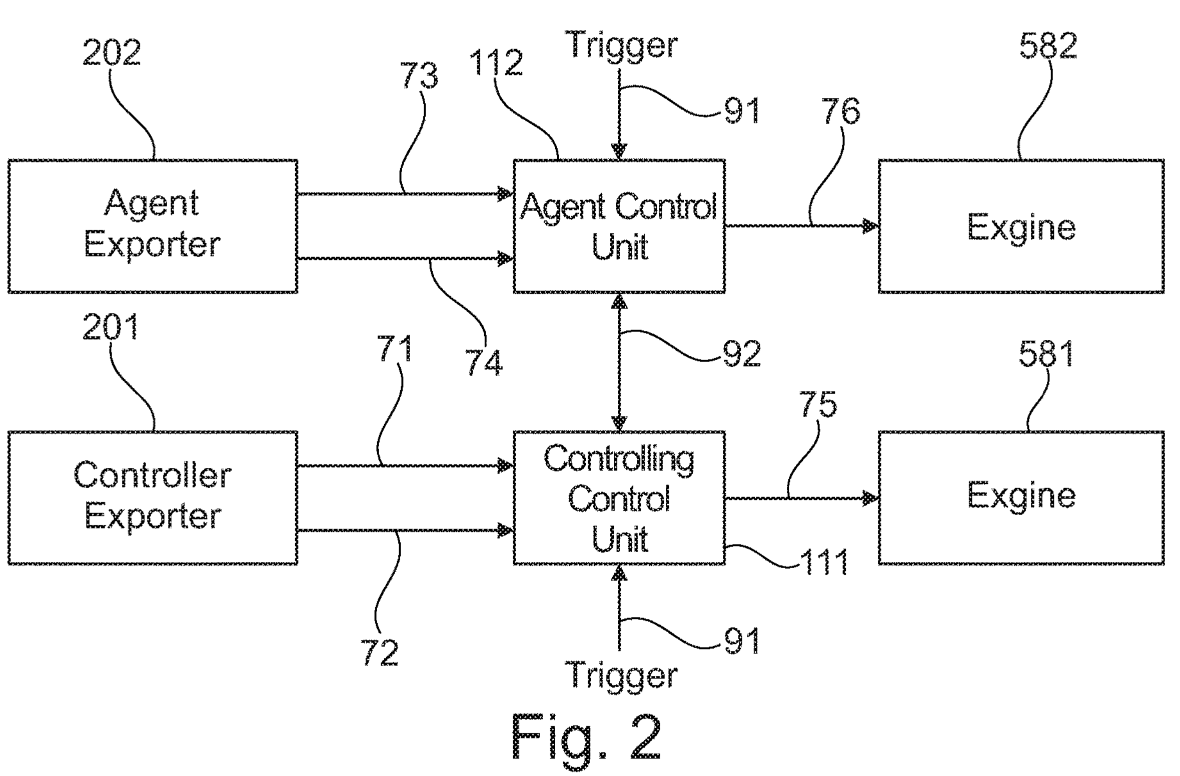
FIG. 2 is a block diagram of an exemplary system for synchronizing audio transmission in a single frequency network, the system comprising first and second exporters and associated first and a second control units that output a respective digital audio signal to an associated exciter engine.

FIG. 2 illustrates a system for synchronizing audio transmission in a single frequency network. The system comprises a plurality of exporters, wherein FIG. 2 depicts two exporters, a first exporter 201 and a second exporter 202. The first exporter 201 may be a controller or master exporter and the second exporter 202 may be an agent or slave exporter. While FIG. 2 depicts one second exporter 202 only, there may be provided further second exporters 202. Each exporter 201, 202 may be similar to exporter 20 in the broadcasting system of FIG. 1 in may be implemented in the same environment. Accordingly, for example, exporters 201, 202 may be located at a studio site of a broadcasting system.

Each exporter 201, 202 is associated with a respective control unit 111, 112. With exporter 201 representing a controller or master exporter, the associated control unit 111 is a controlling or a master control unit. Similarly, with exporter 202 representing an agent or slave exporter, the associated control unit 112 is an agent or slave control unit.

Control unit 111 receives a first digital audio signal 71 (comprised of frames of digital audio data) from the first exporter 201. The first digital audio signal 71 may comprise MPS audio and MPS data as discussed with respect FIG. 1. It may further comprise SPS audio and SPS data. A single data stream may be conveyed from the first exporter 201 that contains the main program digital audio along with the supplemental programs and all of the associated data. Generally, the exporter 201 performs two main functions: (i) handling the MPS digital audio and MPS data and accepting the AAS and SPS data streams coming from an importer (see importer 18 of FIG. 1); and (ii) combining all these services for transport over a studio transmitter link.

In a similar manner, control unit 112 receives a second digital audio signal 73 from the second exporter 202. More particularly, control unit 112 receives a second digital audio signal 73 (comprised of frames of digital audio data) from the second exporter 202. The second digital audio signal 73 may comprise MPS audio and MPS data as discussed with respect FIG. 1. It may further comprise SPS audio and SPS data. A single data stream may be conveyed from the second exporter 202 that contains the main program digital audio along with the supplemental programs and all of the associated data. Generally, the exporter 202 performs two main functions: (i) handling the MPS digital audio and MPS data and accepting the AAS and SPS data streams coming from an importer (see importer 18 of FIG. 1); and (ii) combining all these services for transport over a studio transmitter link.

The first exporter 201 and the second exporter 202 may additionally provide analog audio 72, 74 to the respective control unit 111, 112. This follows standard procedure as discussed with respect to FIG. 1 and is well known to the skilled person and, accordingly, is not discussed in detail. The analog data may be provided in an audio engineering society format (AES) and may be a digitized version of an analog audio signal of the MPS audio. The analog MPS audio may be delayed.

The first control unit 111 buffers the first digital audio signal 71 and outputs the first digital audio signal on a link 75 to a first exciter engine 581 which broadcasts the first digital audio signal. The first control unit 111 further transmits the first digital audio signal 71 (together with the analog audio 72) on a line 92 to the second control unit 112. The first control unit 111 also transmits commands such as synchronization commands to the second control unit 112 on link 92. The link 92 may be implemented in a plurality of manners, such as by a packet based link using the User Datagram Protocol (UDP).

The second control unit 112 buffers the second digital audio signal 72. However, the second control unit 112 further receives the first digital audio signal 71 together with commands from the first control unit 111 over line 92. The second control unit 112 thus also buffers the first digital audio signal 71.

Figure 5:
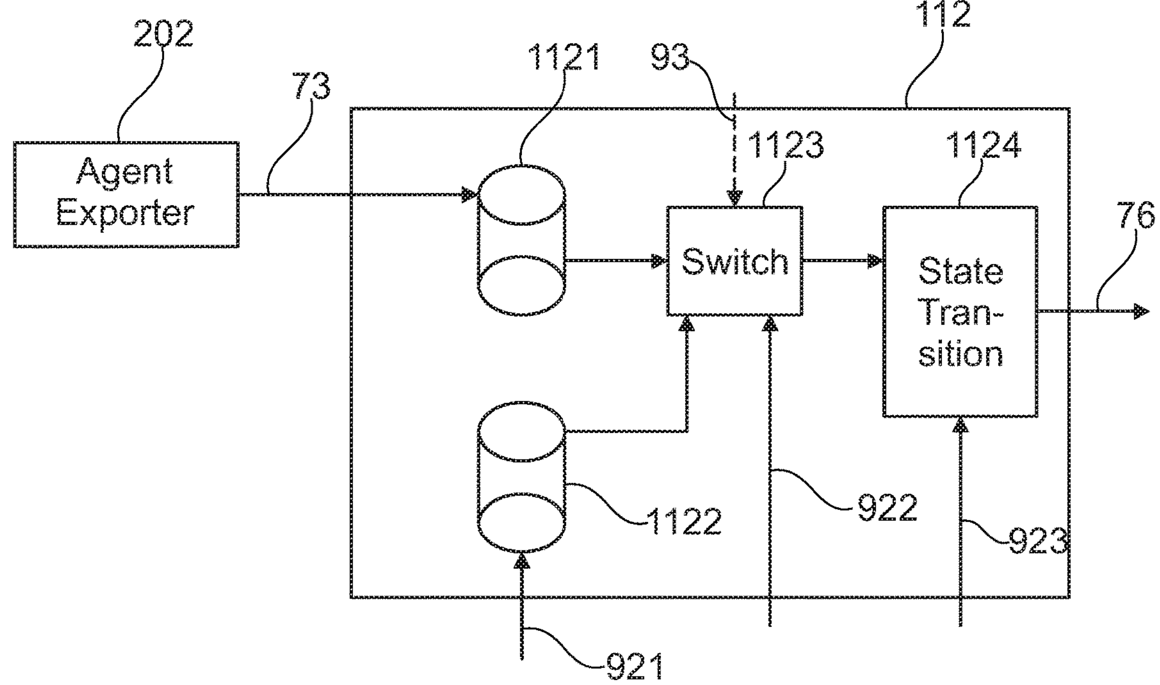
FIG. 5 is a block diagram of an exemplary embodiment of the second control unit of the system of FIG. 2.
Figure 6:
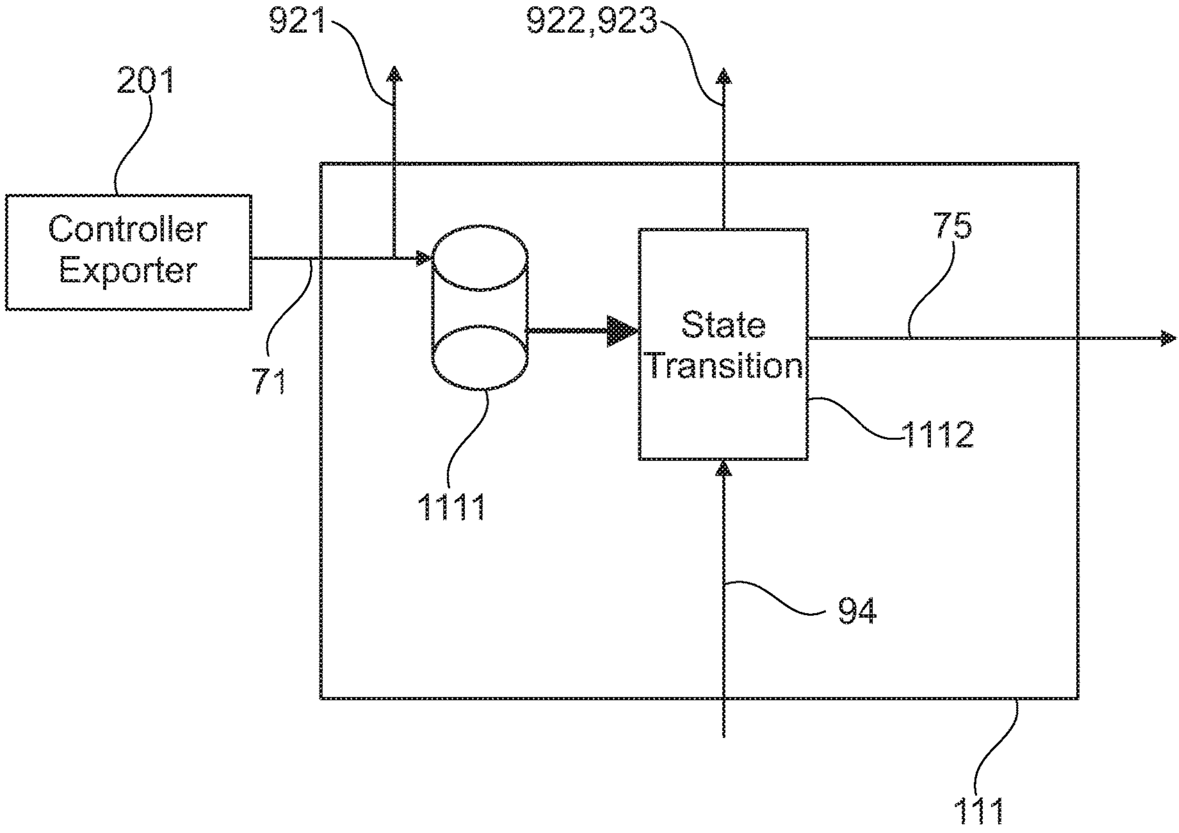
FIG. 6 is a block diagram of an exemplary embodiment of the first control unit of the system of FIG. 2.

This is illustrated in FIGS. 5 and 6. FIG. 5 shows an embodiment of the second control unit 112. The second control unit 112 comprises a first, local data queue or buffer 1121 that receives the second digital audio signal 73 from the agent exporter 202. The second control unit 112 further comprises a second data queue or buffer 1122 for audio/data received on line 921 from the first control unit 111. Further, a switch 1123 is provided having a first input coupled to buffer 1121 and a second input coupled to buffer 1122. The switch 1123 further comprises an output coupled, through a state transition module 24, to a link 76 for outputting the output to the second exciter engine 582 shown in FIG. 2. The link 76 may be an STL link as discussed with respect to FIG. 1. For example, it may be a link as provided by GatesAir, Inc.

The output of both buffers 1121, 1122 is input to switch 1123. The switch 1123 receives commands on line 922 (which is part of line 92 of FIG. 2) from the first control unit 111. The received commands include instructions for the switch 1123 of switching either the first digital audio signal buffered in buffer 1122 or the second digital audio signal buffered in buffer 1121 to the output. The output, which is transmitted over link 76, accordingly, includes either the buffered first digital audio signal or the second buffered digital audio signal.

Alternatively, as indicated in FIG. 5, the command for switching the input of switch 1123 may be received through a line 93 from another source or instance responsible for the content broadcast by exciter engine 582.

If the command for switching the input of switch 1133 is a received from the first control unit 111, the respective control commands may have been generated at the first exporter 201 or at another source or instance.

The second control unit 112 further comprises the state transition module 1124 connected with its input to switch 1123 and providing its output to link 76. Further, the state transition module receives commands on line 923 from the first control unit 111.

FIG. 6 shows an embodiment of the first control unit 111. The first control unit 111 comprises a local data queue or buffer 1111 for buffering the first digital audio signal 71 from the first exporter 201. The data of the first digital audio signal is also provided on line 921 to the second buffer 1122 of the second control unit 112 as shown in FIG. 5.

The first control unit 111 further comprises a state transition module 1112. The state transition module 112 comprises an input receiving the buffered first digital audio signal from buffer 1111 and an output to output the buffered first digital audio signal on link 75 to the first exciter engine 581. Link 75, similar as link 76, may be an STL link as discussed with respect to FIG. 1. The state transition module 112 further comprises an input for receiving internal commands on line 94 and transmit commands on lines 922, 923 to the switch 1123 and the state transition module 1124 of the second control unit 112.

Referring again to FIG. 2, accordingly, the first digital audio signal is transmitted on link 75 to the first exciter engine 581. Further, dependent on the control commands received by the switch 1123 of the agent control unit 112, the agent control unit 112 transmits on link 76 either the first digital audio signal or the second digital audio signal to the second exciter engine 582.

This infrastructure allows to broadcast local content by exciter engine 582, wherein the local content is received in a limited geographic area only which is covered by the broadcast area of exciter engine 582. For example, the first digital audio signal 71 provided from the first exporter 201 comprises non-local content that may be broadcast to the full coverage area of a single frequency network that comprises the multiple exciter engines 581, 582 (and, possibly, a plurality of further such exciter engines). In particular, if switch 1123 of FIG. 5 receives its input from buffer 1122, the non-local content in accordance with the first digital audio signal is also broadcast by the second exciter engine 582.

On the other hand, if switch 1123 receives its input from local buffer 1111, a different content in accordance with the second digital audio signal is broadcast by exciter engine 582. Such different content can be local content. Such local content may include broadcast news, ads, emergency alerts, etc. relevant for a particular geographical zone only and, accordingly, broadcast by exciter engine 582 only.

Besides providing the functionality of being able to transmit, by the different exporters 201, 202 and associated control units 111, 112, the same or different content to the respective exciter engines 581, 582, the system of FIG. 2 further allows for a fully synchronized transmission of the signals output by the respective control units 111, 112, as will next be explained.

More particularly, both the first control unit 111 and the second control unit 112 receive a trigger signal 91 that triggers synchronized transmission of the buffered digital audio signal by the respective control unit 111, 112 to the respective exciter engine 581, 582. The trigger signal 91 may be an Absolute Logical Frame Number (ALFN) interrupt. However, other trigger signals may be provided alternatively.

Further, the commands signals sent from the state transition module 1112 of the first control unit 111 to the switch 1123 and the state transition module 1124 of the second control unit 112 on lines 922, 923 include i) instructions for the switch 1123 of whether to transmit data from buffer 1121 or buffer 1122 (i.e., local content versus non-local content), ii) signaling to control what state the state transition module 1124 is in; and iii) an arming signal to switch 1123 and/or state transition module 1124 to commence with outputting the audio data on the next ALFN trigger signal.

Figures 7, 8:
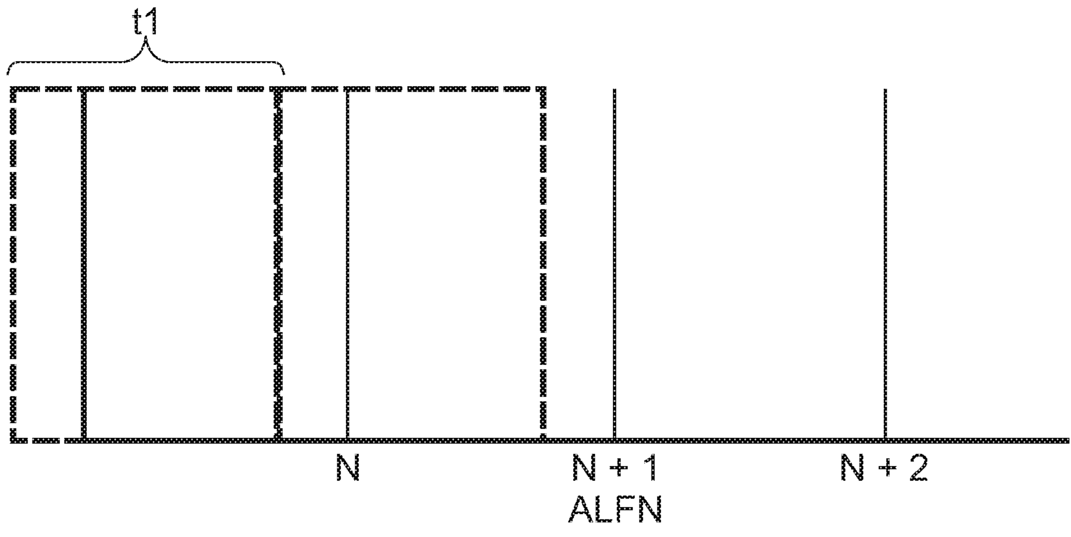
FIG. 7 illustrates the time required to send digital radio data from the first exporter to the first control unit of the system of FIG. 2.
FIG. 8 illustrates the time required to send digital radio data from the second exporter to the second control unit of the system of FIG. 2.

By triggering transmission of the digital audio signals provided by the control unit 111, 112 to the respective exciter engine 581, 582, full synchronization can be achieved. This is illustrated in FIGS. 7 and 8. In FIG. 7, the time t1 illustrates the sending time of a frame (such as 16 blocks) of the digital audio signal sent from the first controller 201 to the first control unit 111. In FIG. 8, the time t2 illustrates the sending time of a frame (such as 16 blocks) of the digital audio signal sent from the second controller 202 to the second control unit 112. Both FIGS. 7, 8 also show the ALFN times with points in time N, N+1, etc. The times t1 and t2 are different meaning that it is not known when exactly the data is received at the respective control unit 111, 112 relative to the ALFN times.

By queuing the data in buffers 1111, 1121, 1122 and by triggering transmission by trigger signals 91, synchronization of the data center to the respective exciter engines 581, 582 is provided for. The data is queued for sending on the Next ALFN+1 with respect to when it arrives at the respective control unit 111, 112. This will ensure that there are at least two full frames of data on hand to send to the exciter engine 581, 582 when the armed signal is sent from state transition module 1112.

On the other hand, if the second control unit 112 has not been armed, it does not forward any data to the exciter engine 582.

The communication between the state transition module 1112 of the first control unit 111 and of state transition module 1124 of the second control unit 112 serve for synchronizing the state of the control units 111, 112. The states include in initialization state and a run state. The initialization state includes establishing a communication between the first control unit 111 and the second control unit 112 (and possibly further agent control units). In the non-initialization state, the armed signal is false. Establishing a communication link comprises a) signaling back and forth, b) establish that GPS data and interrupt trigger is working, and c) turning the state into the initialized state.

While in the initialization state, the first control unit 111 sends the first digital audio signal 71 and control commands to all agent control units 112, and queues up the first digital audio signal 71 in buffer 1111. The second, agent control unit 112 queues up both the first digital audio signal and the second digital audio signal in queues 1121, 1122. At the transition to run state, both the first control unit 111 and the second control unit 112 have the respective digital audio signals enqueued. Once the armed signal is set to true, both the control unit 111 and the second control unit 112 begin outputting data in a synchronized manner on the next ALFN Trigger.

Figure 3:
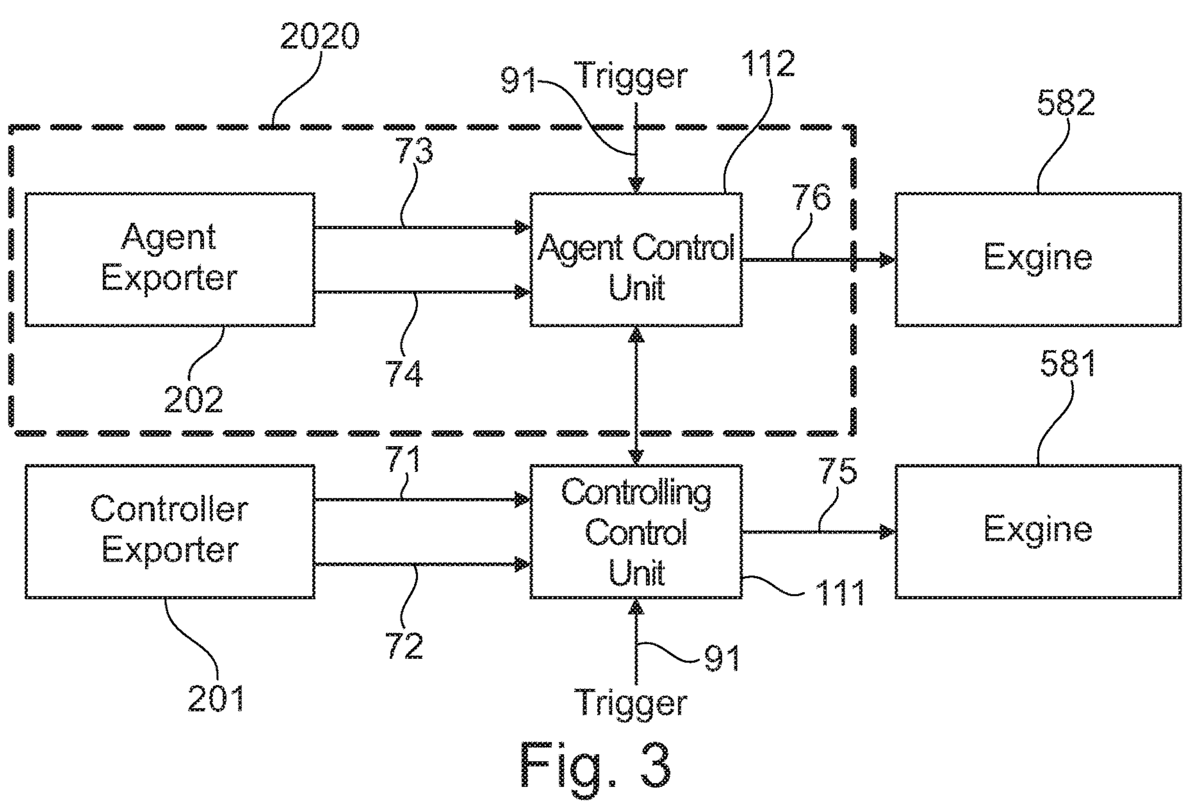
FIG. 3 shows the system of FIG. 2, wherein the second exporter and the second control agent are illustrated to represent an augmented second exporter.
Figure 4:
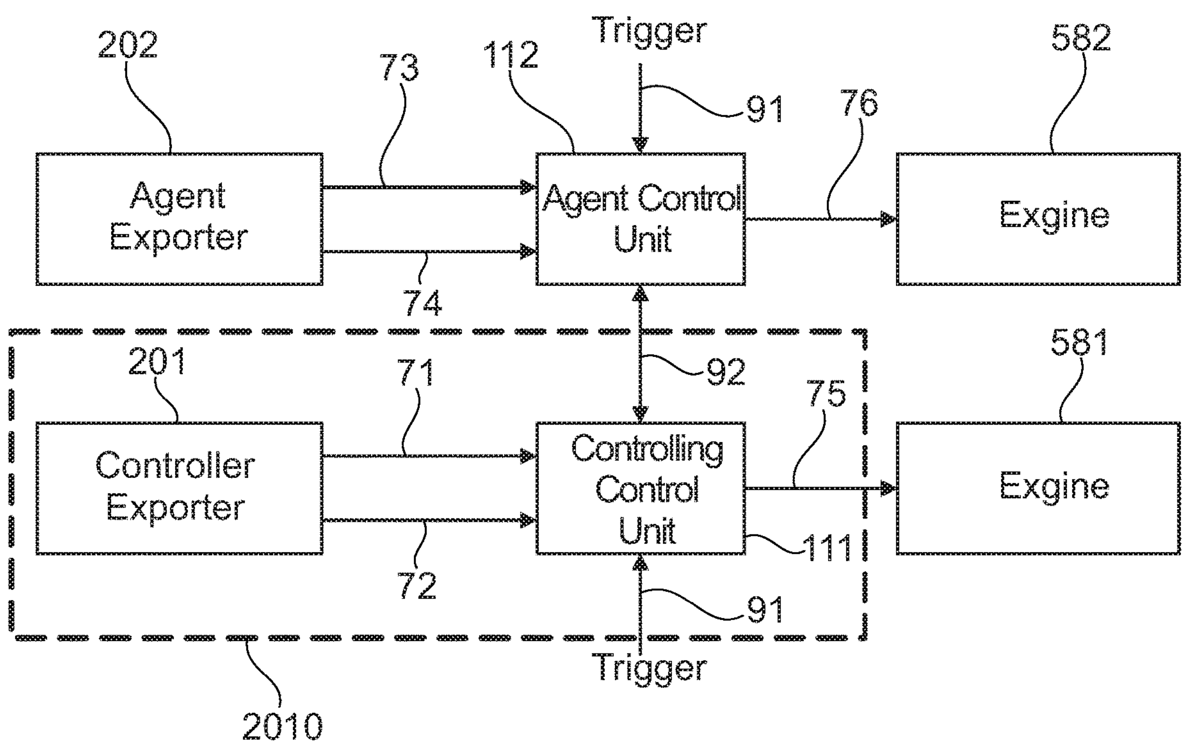
FIG. 4 shows the system of FIG. 2, wherein the first exporter and the first control agent are illustrated to represent an augmented first exporter.

FIGS. 3 and 4 correspond to FIG. 2. They illustrate that the first exporter 201 and the first control unit 111 may be considered an augmented first exporter 2010 (FIG. 4) and that the second exporter 202 and the second control unit 112 may be considered an augmented second exporter 2020 (FIG. 3).

The described system allows to implement a method for synchronizing audio transmission in a single frequency network which comprises a plurality of exciter engines including first exciter engine 581 and second exciter engine 582. The first exporter 202 and the second exporter 202 prepare a first/second digital audio signal 71, 73 for transmission to the respective exciter engine 581, 582. The first digital audio signal 71 is buffered in the first control unit 111. Both the first digital audio signal 71 and the second digital audio signal 73 are buffered in the second control unit 112, wherein the first digital audio signal 71 is transmitted from the first control unit 111 to the second control unit 112. Further, control commands are received at the second control unit 112 regarding the second control unit 112 transmitting the buffered first digital audio signal or the buffered second digital audio signal to the second exciter engine 582. The second control unit 112 transmits the buffered first digital audio signal or the buffered second digital audio signal to the second exciter engine 582 for broadcast dependent on the received control signals.

Further, the buffered first digital audio signal and the buffered second digital audio signal are transmitted in a synchronized manner by the first and second control units 111, 112 based on a trigger signal received by the control units 111, 112.

Alternate Embodiments and Exemplary Operating Environment

Many other variations than those described herein will be apparent from this document. For example, depending on the embodiment, certain acts, events, or functions of any of the methods and algorithms described herein can be performed in a different sequence, can be added, merged, or left out altogether (such that not all described acts or events are necessary for the practice of the methods and algorithms). Moreover, in certain embodiments, acts or events can be performed concurrently, such as through multi-threaded processing, interrupt processing, or multiple processors or processor cores or on other parallel architectures, rather than sequentially. In addition, different tasks or processes can be performed by different machines and computing systems that can function together.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The various illustrative logical blocks and modules described in connection with the embodiments disclosed herein can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Embodiments of the system and method described herein are operational within numerous types of general purpose or special purpose computing system environments or configurations. In general, a computing environment can include any type of computer system, including, but not limited to, a computer system based on one or more microprocessors, a mainframe computer, a digital signal processor, a portable computing device, a personal organizer, a device controller, a computational engine within an appliance, a mobile phone, a desktop computer, a mobile computer, a tablet computer, a smartphone, and appliances with an embedded computer, to name a few.

Such computing devices can typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, and so forth. In some embodiments the computing devices will include one or more processors. Each processor may be a specialized microprocessor, such as a digital signal processor (DSP), a very long instruction word (VLIW), or other micro-controller, or can be conventional central processing units (CPUs) having one or more processing cores, including specialized graphics processing unit (GPU)-based cores in a multi-core CPU.

The process actions or operations of a method, process, or algorithm described in connection with the embodiments disclosed herein can be embodied directly in hardware, in a software module executed by a processor, or in any combination of the two. The software module can be contained in computer-readable media that can be accessed by a computing device. The computer-readable media includes both volatile and nonvolatile media that is either removable, non-removable, or some combination thereof. The computer-readable media is used to store information such as computer-readable or computer-executable instructions, data structures, program modules, or other data. By way of example, and not limitation, computer readable media may comprise computer storage media and communication media.

Computer storage media includes, but is not limited to, computer or machine readable media or storage devices such as Bluray discs (BD), digital versatile discs (DVDs), compact discs (CDs), floppy disks, tape drives, hard drives, optical drives, solid state memory devices, RAM memory, ROM memory, EPROM memory, EEPROM memory, flash memory or other memory technology, magnetic cassettes, magnetic tapes, magnetic disk storage, or other magnetic storage devices, or any other device which can be used to store the desired information and which can be accessed by one or more computing devices.

A software module can reside in the RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an application specific integrated circuit (ASIC). The ASIC can reside in a user terminal. Alternatively, the processor and the storage medium can reside as discrete components in a user terminal.

The phrase "non-transitory" as used in this document means "enduring or long-lived". The phrase "non-transitory computer-readable media" includes any and all computer-readable media, with the sole exception of a transitory, propagating signal. This includes, by way of example and not limitation, non-transitory computer-readable media such as register memory, processor cache and random-access memory (RAM).

The phrase "audio signal" is a signal that is representative of a physical sound.

Retention of information such as computer-readable or computer-executable instructions, data structures, program modules, and so forth, can also be accomplished by using a variety of the communication media to encode one or more modulated data signals, electromagnetic waves (such as carrier waves), or other transport mechanisms or communications protocols, and includes any wired or wireless information delivery mechanism. In general, these communication media refer to a signal that has one or more of its characteristics set or changed in such a manner as to encode information or instructions in the signal. For example, communication media includes wired media such as a wired network or direct-wired connection carrying one or more modulated data signals, and wireless media such as acoustic, radio frequency (RF), infrared, laser, and other wireless media for transmitting, receiving, or both, one or more modulated data signals or electromagnetic waves. Combinations of the any of the above should also be included within the scope of communication media.

Further, one or any combination of software, programs, computer program products that embody some or all of the various embodiments of the system and method described herein, or portions thereof, may be stored, received, transmitted, or read from any desired combination of computer or machine readable media or storage devices and communication media in the form of computer executable instructions or other data structures.

Embodiments of the system and method described herein may be further described in the general context of computer-executable instructions, such as program modules, being executed by a computing device. Generally, program modules include routines, programs, objects, components, data structures, and so forth, which perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the scope of the disclosure. As will be recognized, certain embodiments of the inventions described herein can be embodied within a form that does not provide all of the features and benefits set forth herein, as some features can be used or practiced separately from others.

What is claimed is:

1. A method for synchronizing audio transmission in a single frequency network, the method comprising:

preparing in a first exporter a first digital audio signal for transmission to a first exciter engine of the single frequency network;

buffering the first digital audio signal in a first control unit associated with the first exporter to produce a buffered first digital audio signal and transmitting the buffered first digital audio signal to the first exciter engine for broadcast by the first exciter engine;

preparing in a second exporter a second digital audio signal for transmission to a second exciter engine of the single frequency network;

buffering the second digital audio signal in a second control unit associated with the second exporter to produce a buffered second digital audio signal;

transmitting the first digital audio signal from the first control unit to the second control unit;

buffering in addition to the second digital audio signal also the first digital audio signal at the second control unit;

receiving control commands as received control commands at the second control unit regarding the second control unit transmitting the buffered first digital audio signal or the buffered second digital audio signal to the second exciter engine, wherein the second control unit transmits the buffered second digital audio signal to the second exciter engine for broadcast by the second exciter engine dependent on the received control commands; and synchronizing transmission of the buffered first digital audio signal by the first control unit to the first exciter engine and of the buffered second digital audio signal by the second control unit to the second exciter engine based on a trigger signal received by the first and second control units.

2. The method of claim 1, wherein the trigger signal is an Absolute Logical Frame Number (ALFN) interrupt.

3. The method of claim 1, wherein the first control unit is a controlling control unit and wherein the second control unit is an agent control unit acting upon control commands sent from the first control unit.

4. The method of claim 1, wherein the received control commands received at the second control unit include at least one of:

control commands regarding using the first buffered audio signal or the second buffered audio signal for export to the second exciter engine;

control commands regarding control of a state of the second control unit, the state of the second control unit including at least one of an initialization state and an active state; and control commands regarding commencing exporting the first buffered audio signal or the second buffered audio signal to the second exciter engine on the next trigger signal.

5. The method of claim 1, wherein both the first digital audio signal and the second digital audio signal include at least a main program service digital audio signal.

6. The method of claim 1, wherein the first digital audio signal includes non-local content that is broadcast to a full coverage area of the single frequency network, and wherein the second digital audio signal includes local content that is broadcast to a reduced geographic zone inside the full coverage area of the single frequency network only.

7. The method of claim 1, wherein the steps of preparing the first digital audio signal and the second digital audio signal for transmission to an exciter engine in the first and second exciter engines include:

receiving main program service (MPS) digital audio signals and MPS data;

accepting advanced application services (APS) audio signals and APS data coming from an importer; and combining the MPS and APS audio signals and data into a digital audio signal for transport to the exciter engine.

8. The method of claim 1, wherein the first control unit communicates with further control units associated with further exporters as with the second control unit.

9. The method of claim 1, wherein the control commands received at the second control unit regarding the second control unit transmitting the buffered first digital audio signal or the buffered second digital audio signal to the second exciter engine have been transmitted by the first control unit to the second control unit.

10. A system for synchronizing audio transmission in a single frequency network, the system comprising:

a first exporter configured to prepare a first digital audio signal for transmission to a first exciter engine of the single frequency network;

a first control unit configured to buffer the first digital audio signal to produce a buffered first digital audio signal and transmit the buffered first digital audio signal to the first exciter engine for broadcast by the first exciter engine;

a second exporter configured to prepare a second digital audio signal for transmission to a second exciter engine of the single frequency network; and a second control unit configured to buffer the second digital audio signal to produce a buffered second digital audio signal;

wherein the first control unit is further configured to transmit the first digital audio signal from the first control unit to the second control unit;

wherein the second control unit is further configured to also buffer the first digital audio signal;

wherein the second control unit is further configured to receive control commands as received control commands regarding transmitting the buffered second digital audio signal to the second exciter engine, and to transmit the buffered second digital audio signal to the second exciter engine for broadcast by the second exciter engine dependent on the received control commands; and wherein the first control unit and the second control unit are configured to synchronously transmit the buffered digital audio signal to the respective exciter engine based on a trigger signal received by the first and second control units.

11. The system of claim 10, wherein the first control unit and the second control unit are configured to receive as the trigger signal an Absolute Logical Frame Number (ALFN) interrupt.

12. The system of claim 10, wherein the first control unit is configured as a controlling control unit and wherein the second control unit is configured as an agent control unit acting upon control commands sent by the first control unit.

13. The system of claim 10, wherein the first control unit is configured to send control commands to the second control unit that include at least one of:

control commands regarding the second control unit using the first buffered digital audio signal or the second buffered digital audio signal for export to the second exciter engine;

control commands regarding control of a state of the second control unit, the state of the second control unit including at least one of an initialization state and an active (run) state; and control commands regarding the second control unit commencing exporting the first buffered digital audio signal or the second buffered digital audio signal to the second exciter engine on the next trigger signal.

14. The system of claim 10, wherein both the first digital audio signal and the second digital audio signal include at least a main program service digital audio signal.

15. The system of claim 10, wherein the first digital audio signal includes non-local content that is broadcast to a full coverage area of the single frequency network, and wherein the second digital audio signal includes local content that is broadcast to a reduced geographic zone inside the full coverage area of the single frequency network only.

16. The system of claim 10, wherein configuring the first or second exporter to prepare the first or second digital audio signal for transmission to the first or second exciter engine of the single frequency network comprises:

configuring the exporter to receive main program service (MPS) digital audio signals and MPS data;

configuring the exporter to accept advanced application services (APS) audio signals and APS data coming from an importer; and configuring the exporter to combine the MPS and APS audio signals and data into a digital audio signal for transport to the exciter engine.

17. The system of claim 10, further comprising further control units associated with further exporters, wherein the first control unit is configured to communicate with further control units as with the second control unit.

18. The system of claim 10, wherein the first control unit is configured to transmit the control commands regarding the second control unit transmitting the buffered first digital audio signal or the buffered second digital audio signal to the second exciter engine control unit to the second control unit.

19. The system of claim 10, wherein the second control unit comprises:

a first data queue for buffering the first digital audio signal;

a second data queue for buffering the second digital audio signal; and a switch, the switch comprising:

a first input coupled to the first data queue;

a second input coupled to the second data queue; and an output coupled to a link for outputting data to the second exciter engine;

wherein the switch is configured to switch the first input or the second input to the output dependent on control commands received by the first control unit.

20. The system of claim 10, wherein the first control unit comprises:

a data queue for buffering the first digital audio signal; and a state transition module, wherein the state transition module is configured to receive the buffered first digital audio signal from the data queue;

output the buffered first digital audio signal to the first exciter engine;

transmit control commands to the second control unit; and receive external synchronizing commands.

* * * * *